April 20, 1937. J. C. RIVERS 2,077,585
TRANSIT ADVERTISING DEVICE
Filed Sept. 5, 1936
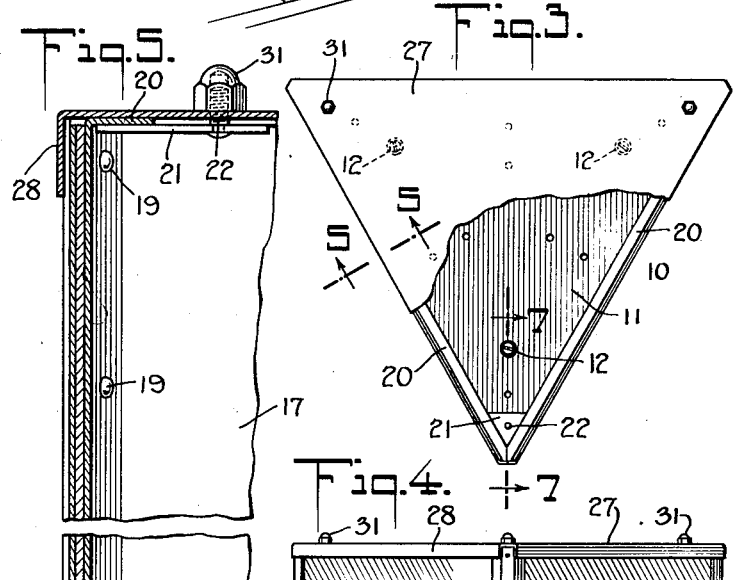
INVENTOR
Joseph Crawford Rivers
HIS ATTORNEY Patented Apr. 20, 1937

2,077,585

UNITED STATES PATENT OFFICE 2,077,585

TRANSIT ADVERTISING DEVICE

Joseph Crawford Rivers, New York, N. Y.

Application September 5, 1936, Serial No. 99,506

1 Claim. (Cl. 40—129)

My present invention relates to advertising signs, and more particularly to an improved portable advertising sign for use on vehicles or other movable bodies.

My invention is designed for advertising merchandise, materials, or any idea or information it is desired to bring quickly and forcibly to the attention of the general public. In carrying out my invention, I have constructed a relatively small, portable fixture, having a plurality of sides or faces exposed to view and in which a plurality of such faces are visible to the eye of an observer at one and the same time. The structure is strikingly simple and effective and has been designed primarily for use on the top of taxi cabs, or the tops of motor vehicles of a similar character privately owned. Also, it is adapted for use on buses, vans, street cars, trains and boats.

Such structure is completely weatherproof, and the exposed faces are adapted for holding in viewing position cards or placards, or other advertising matter, and to protect the same against the weather. Also, the cards containing the advertising matter or the like are readily removed and inserted, or new ones inserted in position on the structure.

Preferably, the construction is triangular in plan view and with the apex of one of the angles pointed to the front of the carrying medium, and as such medium is movable there is presented the least possible resistance to the passage of the construction. My construction is practically streamlined and the sides of the construction and the advertising signs are visible from all angles, front, rear, and sides. Particularly is it true that when the vehicle carrying the sign is moving toward an observer two sides of the triangle are visible to the eye of said observer.

A feature of my invention therefore is an improved advertising display apparatus having a plurality of advertising faces.

A feature of my invention is an improved advertising display apparatus having a plurality of faces disposed around the peripheral face thereof.

A feature of my invention is an improved non-cylindrical multi-sided advertising display apparatus.

In the accompanying drawing:

Fig. 1 is a perspective view of the sedan type of automobile, having my improved invention mounted on the top thereof.

Fig. 2 is a side elevation of the portion of the top part of the vehicle shown in Fig. 1, and illustrating my invention in side elevation.

Fig. 3 is a plan view of the features shown in Fig. 2.

Fig. 4 is a front elevation of Fig. 3.

Fig. 5 is a sectional elevation on the line 5—5 of Fig. 3.

Fig. 6 is a sectional plan view on the line 6—6 of Fig. 4, and

Fig. 7 is a sectional elevation on the line 7—7 of Fig. 3.

Referring to the drawing, and more particularly to Figs. 3 to 7, inclusive, 10 designates generally my improved advertising display apparatus. This apparatus comprises a bottom plate 11, preferably of triangular form in plan view, as shown in Fig. 3. Through the bottom plate 11, at spaced points, pass bolts 12 and by means of which the apparatus is secured to the top 13 of a motor vehicle 14, as shown in Fig. 1, or to any other type of motor vehicle including buses, vans, street cars, trains or boats.

Because of the fact that in the ordinary automobile, as in the automobile 14, the roof is curved as shown in Fig. 7, and as it is preferably desirable to have the display apparatus 10 substantially level, I place blocks 15 of resilient material, such as rubber, beneath the bottom plate 11, and the thickness of the block 15 will depend on the amount of camber to the top 13 of the vehicle. Such blocks 15 not only act to "level up" the display apparatus 10, but also minimize shocks that might otherwise be transmitted to the same in the passage of the vehicle 14 over a roadway.

The bottom plate 11 has its edges folded up to form flanges, as indicated by the reference numeral 16. Secured to the flanges 16 and extending around the periphery of the bottom 11 is a wall member 17. This wall member is preferably made of sheet metal, and is secured to the flanges 16 by rivets 18. The wall 17 is preferably made of a single sheet of material, its meeting edges overlapping preferably at one of the corners of the bottom 11, and such overlapping edges are secured together, as by rivets 19.

The size of the wall 17 may be such as desired, and bears a definite relation to the length of the sides of the triangular bottom 11, so as preferably to make the advertisement carrying faces to be hereinafter described substantially rectangular. The upper edge of the wall member 17 is folded over, as indicated at 20, so as to lie above and in a plane substantially parallel to the plane in which lies the bottom 11. At each corner of the wall 17 is secured as by spot welding, a reenforcing gusset 21. Secured to each of the gussets 21 and extending upwardly therefrom are threaded studs 22, for a purpose to be hereinafter described. The outer face of the wall 17 acts as the backing for advertising signs or placards which are normally of flexible material such as cardboard and the like.

Secured to the under face of the bottom 11, as by rivets 23, are angle members 24, and as will be noted from an inspection of the drawing, and particularly Figs. 5 and 6, there is one portion of the angle members 24 which extends upwardly from the bottom 11 and lies parallel to and spaced apart from the wall member 17, and thereby defines a space in which may be placed advertising signs or placards 25, and a protecting transparent member 26, of glass, celluloid or any other suitable transparent material.

27 designates a cover for the substantially open box formed of the bottom 11 and wall 17, such cover 27 being similar in shape to the bottom 11, but large enough in size to have its depending skirt or lip 28 slightly larger than the bottom plate 11 plus the angle member 24, to thereby provide at the top of the wall 17 and between such wall and the skirt or lip 28, a space which will readily house the advertising card 25 and protecting member 26. Also, the depending skirt or lip 28 of the cover 27 is large enough to enclose corner supporting means for the wall 17.

This corner protecting means is shown in detail in Fig. 6, and referring to such figure it will be noted that the corner protecting member is designated by the reference numeral 29, and has one portion thereof secured to the corner formed by adjacent faces of the wall 17 by rivets or other suitable means. Also, the side portions of such corner protecting member 29 lie substantially parallel to the upstanding portion of the angle members 24, to thereby form a continuation of the trough made by upstanding portion of the angle 24 and the wall 17.

The cover 27 is provided with a plurality of holes, equal in number to the number of studs 22, and symetrically arranged to have such studs pass through the holes. The studs 22 are then provided with preferably ornamental nuts 31 and by means of which the cover 27 is held in position on top of the wall 17.

It will be noted that the resulting structure is substantially preferably triangular in plan view and that it is placed on a vehicle, as the motor vehicle 14, with the apex or one of the corners pointed to the front of such vehicle. It will be apparent therefore, that when thus positioned there is a minimum of resistance to the passage of the device through the air. Also, it will be noted that a person seeing a motor vehicle, such as a motor vehicle 14, approaching with one of the pieces of apparatus thereon and containing advertising display cards, will be able to see two surfaces of the apparatus. As the motor vehicle 14 passes the observer one side of the apparatus, as that shown in Fig. 2, will be in full view. As the vehicle moves past the observer the display card in the rear of the apparatus will be visible to the observer as shown in Fig. 1.

The cover 27 is readily removable and replaceable by merely manipulating the nuts 31 and thus exposing the upper end of the slots which retain the display cards 25 in position. The display cards may therefore be renewed or replaced in a minimum of time and with very little effort.

Whereas I have described my invention by reference to specific forms thereof, it will be understood that many changes and modifications may be made without departing from the spirit of the invention.

I claim:

An improved advertising card display device comprising, a plate forming a multi-sided figure in plan view and having its peripheral edges folded up to form flanges, a wall member extending around the peripheral edge of the plate and having its lower edge secured to the flanges, said wall member having its upper edge folded inwardly to lie in a plane substantially parallel to the plane in which lies the plate, reinforcing members secured to the under face of the inturned portions of the wall member at the intersection of the adjacent sides of the multi-sided plate, an angular member having one element secured to the bottom plate and having its other element spaced apart from but parallel to the folded up edges of the bottom plate, channel members arranged to partially encircle the corners of the multi-sided figure and secured throughout its length to the angles formed by the wall member at the corners of the multi-sided figure and said channel member having its arms lying parallel to the wall member and in substantially the same plane as the element of the angle members secured to the bottom plate, whereby there is defined on each of the faces of the multi-sided figure an advertising card receiving receptacle open at the top, a closure for the open top of the receptacle formed by the wall member, and said closure having its peripheral edges folded downwardly to conform with the contour of the upper end of the structure formed by the wall member and channel members to thereby close the open end of the card receiving receptacles, and means for removably securing said cover in position.

JOSEPH CRAWFORD RIVERS.